(No Model.)
W. H. MERCER.
COMBINED COTTON CHOPPER AND SCRAPER.
No. 355,547. Patented Jan. 4, 1887.
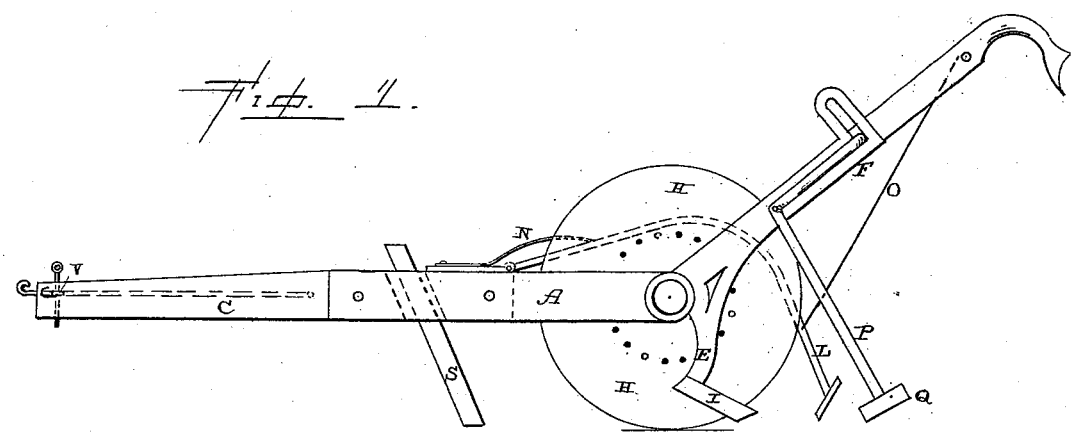
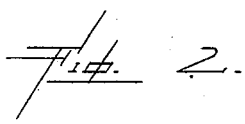
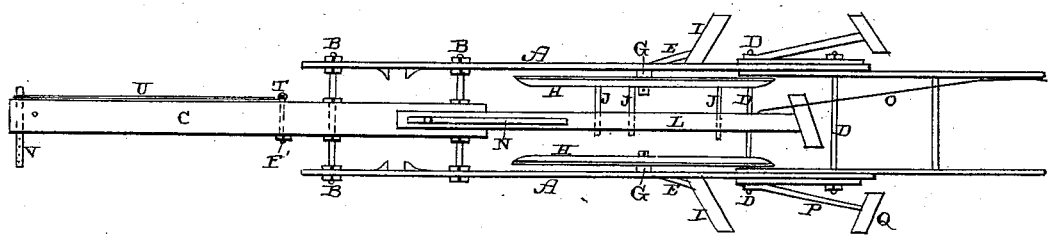

UNITED STATES PATENT OFFICE.

WILLIAM H. MERCER, OF MERCER, SOUTH CAROLINA.

COMBINED COTTON CHOPPER AND SCRAPER.

SPECIFICATION forming part of Letters Patent No. 355,547, dated January 4, 1887.

Application filed October 26, 1886. Serial No. 217,262. (No model.)

*To all whom it may concern:*

Be it known that I, W. H. MERCER, of Mercer, in the county of Union and State of South Carolina, have invented certain new and useful Improvements in Combined Cotton Choppers and Scrapers; and I do hereby declare the following to be a full, clear, and exact description of the invention, such as will enable others skilled in the art to which it pertains to make and use it, reference being had to the accompanying drawings, which form part of this specification.

My invention relates to an improvement in combined cotton scrapers and choppers; and it consists in, first, the combination of the draft-bars provided with journals upon their inner sides with the wheels, which are placed upon the journals, and provided with cams or lifting devices for operating the cotton-chopper; second, the arrangement and combination of parts, which will be more fully described hereinafter.

The object of my invention is to so construct the draft-bars that they can be made in a single piece with the standards and handle-bars, and then bolted together so as to form the frame-work of the machine and to form journals upon the inner sides of the draft-bars, so as to receive the wheels, and thus make the wheels entirely independent of each other.

Figure 1 is a side elevation of a machine to which my invention is applied. Fig. 2 is a plan view of the same.

A represents the two metallic draft-bars, which are rigidly secured together by the two bolts, B, which are passed through their front ends and through the rear end of the wooden beam C, and by the two bolts, D, which are passed through their rear ends. These draft-bars A are made from metal, and in a single piece with the standards E and the handle-bars F. These draft-bars form the frame of the machine, and have formed upon their inner sides the journals G, upon which the concavo-convex wheels H are placed. These wheels serve not only to cut into the ground upon each side of the plant, but serve as fenders to prevent the dirt from being thrown upon them by the scrapers or cultivators, which are secured to the standards E. Each one of the wheels H being placed upon a separate and independent journal, G, of its own, they are made independent of each other in every way. One or both of these wheels H are provided with lifters or cams J, which project toward the center of the frame, and which serve to alternately lift the cotton-chopper L, which is pivoted or journaled upon the rear end of the beam C. These tappets or lifters J are made adjustable in relation to each other, so that the distance between them can be varied according to the number of plants it is desired to leave standing. The wheels will be provided with a series of holes, which are placed upon a circle, and the lifters J to be changed from one hole to another, as may be desired.

The cotton-chopper L is forced downward by means of the spring N, which is pivoted upon the top of the beam C, and which bears downward upon the curved shank of the chopper, as shown in Fig. 1, so as to return it quickly to the ground as soon as it is left free to move by the onward passage of the lifter. Fastened to this cotton-chopper L is a wire, cord, or chain, O, which extends back to the handle, as shown in Fig. 2, so that the chopper can be held in a raised position at any time it is desired to prevent it from operating.

Pivoted to the outer sides of the handle-bars F are the L-shaped arms or standards P, which have shovels or scrapers Q secured to their lower ends for brushing a portion of the dirt which has been loosened back toward the plants after the scraping and chopping is done. Near the inner side of the front end of each of the draft-bars A is made a socket, R, in which a cutter, colter, or any similar device, S, is placed, and which removes the clods or breaks the hard crusty land, so that the cutting-edges of the wheels H can enter the ground.

The beam C is preferably made of wood, and is secured rigidly in position between the front ends of the draft-bars A by means of the bolts B. Passing through this beam C is a rod or bolt, F′, and secured to one end of this bolt is the draft-rod U, which extends forward and has its front end fastened to the draft-rod V, which is passed through the front end of the beam C, as shown. This rod V projects to one side of the front end of the beam, and is provided with a number of perforations, so that the draft-animal can be fastened to this rod and then be made to work any desired distance to one side of the plants.

Having thus described my invention, I claim—

1. In a cotton-cultivator, the combination of the two draft-bars provided with journals upon their inner sides for the wheels, the standards E, and the handle-bars F, united together by the bolts B D, with the wheels H, scrapers I, and beam C, the beam being secured in position upon the bolts B, substantially as shown.

2. The combination of the draft-bars A, the standards E, and handle-bars F, and provided with the journals G upon their inner sides, and the wheels H, made independent of each other and placed upon the journals, substantially as described.

3. The combination of the draft-bars A, provided with journals upon their inner sides to receive the wheels H, and having the sockets in which the colter or cutters S are placed for breaking the ground in advance of the wheels, substantially as set forth.

4. The combination of the draft-bars A, the standards and handle-bars F, provided with the journals G upon their inner sides, with the wheels H, provided with the lifters J, the beam C, cotton-chopper L, and the spring N, substantially as specified.

In testimony whereof I affix my signature in presence of two witnesses.

W. H. MERCER.

Witnesses:
A. N. WOOD,
W. J. WILKINS.